United States Patent
Chen et al.

(10) Patent No.: US 11,314,318 B2
(45) Date of Patent: Apr. 26, 2022

(54) SERVER SYSTEM AND POWER-SAVING METHOD THEREOF

(71) Applicant: MITAC COMPUTING TECHNOLOGY CORPORATION, Taoyuan (TW)

(72) Inventors: Cheng-Chun Chen, Taoyuan (TW); Jing-Chin Huang, Taoyuan (TW); Chih-Peng Chang, Taoyuan (TW)

(73) Assignee: MITAC COMPUTING TECHNOLOGY CORPORATION, Taoyuan (TW)

( * ) Notice: Subject to any disclaimer, the term of this patent is extended or adjusted under 35 U.S.C. 154(b) by 163 days.

(21) Appl. No.: 16/573,236

(22) Filed: Sep. 17, 2019

(65) Prior Publication Data

US 2020/0097063 A1    Mar. 26, 2020

(30) Foreign Application Priority Data

Sep. 26, 2018   (TW) .................................. 107133936

(51) Int. Cl.
*G06F 1/3287*   (2019.01)
*H04W 52/02*   (2009.01)

(52) U.S. Cl.
CPC ...... *G06F 1/3287* (2013.01); *H04W 52/0229* (2013.01); *H04W 52/0235* (2013.01); *H04W 52/0274* (2013.01)

(58) Field of Classification Search
CPC ........ G06F 1/26; G06F 1/3209; G06F 1/3287; H04W 52/0229; H04W 52/0235; H04W 52/0274; Y02D 10/00; Y02D 30/70
See application file for complete search history.

(56) References Cited

U.S. PATENT DOCUMENTS

| 6,523,128 | B1 * | 2/2003 | Stapleton | G06F 1/3203 |
| | | | | 713/324 |
| 6,775,784 | B1 * | 8/2004 | Park | G06F 1/3203 |
| | | | | 713/320 |

(Continued)

FOREIGN PATENT DOCUMENTS

| CN | 107908583 A | 4/2018 |
| TW | 201211749 A | 3/2012 |

*Primary Examiner* — Jaweed A Abbaszadeh
*Assistant Examiner* — Brian J Corcoran
(74) *Attorney, Agent, or Firm* — Rabin & Berdo, P.C.

(57) ABSTRACT

A server system and a power-saving method thereof are provided. The power-saving method includes: enabling, by a programmable logic unit in a working mode, a power-on control unit to operate according to a working power; determining, by the power-on control unit in the working mode, whether a power-saving power-off signal is received, and when the power-saving power-off signal is received, controlling, by the power-on control unit, the server system to be powered off and switched from the working mode to a soft-off mode; operating, by the programmable logic unit, according to standby power to enable, in the soft-off mode, the power-on control unit to operate according to the standby power; and turning off, by a baseboard management control unit, the programmable logic unit according to the power-saving power-off signal when the power-on control unit operates according to the standby power, to turn off the power-on control unit.

18 Claims, 3 Drawing Sheets

(56) References Cited

U.S. PATENT DOCUMENTS

| | | | | |
|---|---|---|---|---|
| 7,240,222 B1* | 7/2007 | Falik | ............... | G06F 1/3209 |
| | | | | 713/300 |
| 2010/0125743 A1* | 5/2010 | Yeh | ............... | G06F 1/3203 |
| | | | | 713/320 |
| 2010/0332870 A1* | 12/2010 | Chen | ............... | G06F 1/3209 |
| | | | | 713/320 |
| 2012/0047381 A1* | 2/2012 | Zhou | ............... | G06F 1/3203 |
| | | | | 713/323 |
| 2015/0106638 A1* | 4/2015 | Sun | ............... | G06F 1/266 |
| | | | | 713/323 |

* cited by examiner

SERVER SYSTEM AND POWER-SAVING METHOD THEREOF

CROSS-REFERENCE TO RELATED APPLICATION

This non-provisional application claims priority under 35 U.S.C. § 119(a) to Patent Application No. 107133936 filed in Taiwan, R.O.C. on Sep. 26, 2018, the entire contents of which are hereby incorporated by reference.

BACKGROUND

Technical Field

The present invention relates to a server system, and in particular, to a power-saving method of the server system.

Related Art

With the promotion of power-saving and energy-saving awareness, how to reduce the power consumption of servers has been one of the objectives to which the industry is dedicated. In the prior art, the server can operate in a soft-off mode or a sleep mode with low power consumption. However, in order to maintain a function that the server can be awoken by a remote end or controlled to be powered on by a remote end, main power-consuming elements such as a platform controller hub (PCH) and a power supply management unit in a server device are in a standby state, namely, in the soft-off mode or in the sleep mode. In this case, all the power consumption of the elements in the server device is only reduced instead of being fully cut off. In the long term, the whole power consumed by these elements is considerably large.

SUMMARY

In view of this, the present invention provides a server system and a power-saving method thereof.

In an embodiment, a server system has a soft-off mode and a working mode conforming to the Advanced Configuration and Power Interface (ACPI) specification and a power-saving power-off mode. The server system includes: a power supply unit, a power-on control unit, a programmable logic unit, and a baseboard management control unit. The power supply unit is configured to provide working power in the working mode and provide standby power in the soft-off mode. The power-on control unit is configured to: determine, in the working mode, whether a power-saving power-off signal is received, and when the power-saving power-off signal is received, control the server system to be powered off and switched from the working mode to the soft-off mode. The programmable logic unit is coupled to the power supply unit and the power-on control unit, and is configured to: enable, in the working mode, the power-on control unit to operate according to the working power and operate in the soft-off mode according to the standby power to enable the power-on control unit to operate according to the standby power. The baseboard management control unit is coupled to the power supply unit and the programmable logic unit is configured to: operate in the soft-off mode according to the standby power, and turn off the programmable logic unit according to the power-saving power-off signal when the power-on control unit operates according to the standby power, so as to turn off the power-on control unit and switch the server system from the soft-off mode to the power-saving power-off mode. Power consumption of the server system operating in the power-saving power-off mode is less than that of the server system operating in the soft-off mode.

In an embodiment, a power-saving method adapted for a server system includes: providing, by a power supply unit, working power in the working mode; enabling, by a programmable logic unit in the working mode, a power-on control unit to operate according to the working power; determining, by the power-on control unit in the working mode, whether a power-saving power-off signal is received, and when the power-saving power-off signal is received, controlling, by the power-on control unit, the server system to be powered off and switched from the working mode to the soft-off mode; providing, by the power supply unit, standby power in the soft-off mode after the server system is switched from the working mode to the soft-off mode; operating, by the programmable logic unit, according to the standby power to enable, in the soft-off mode, the power-on control unit to operate according to the standby power; and turning off, by a baseboard management control unit, the programmable logic unit according to the power-saving power-off signal when the power-on control unit operates according to the standby power, to turn off the power-on control unit and switch the server system from the soft-off mode to the power-saving power-off mode. Power consumption of the server system operating in the power-saving power-off mode is less than that of the server system operating in the soft-off mode.

In conclusion, according to the embodiments of the server system and the power-saving method thereof of the present invention, the server system can operate in the power-saving power-off mode. In the power-saving power-off mode, the power-on control unit and the programmable logic unit responsible for power supply control are turned off, only the power supply of the baseboard management control unit on a main board of the server system is reserved, and the baseboard management control unit determines, in the power-saving power-off mode, whether the server system needs to be controlled to be powered on. That is, the baseboard management control unit replaces the programmable logic unit to be responsible for power supply control of the server system. In this way, compared with the prior art, power consumed by the standby power-on control unit and programmable logic unit in the soft-off mode of the server system is reduced, and the server system has a low power consumption value, thereby meeting requirements for power saving and energy saving.

DETAILED DESCRIPTION

Figure 1:
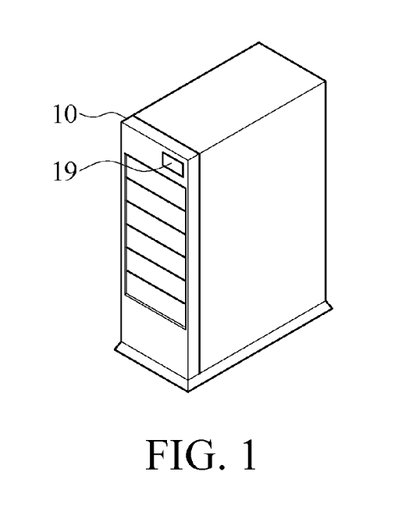
FIG. 1 is a schematic diagram of an appearance of an embodiment of a server system having a power-saving function according to the present invention.
Figure 2:
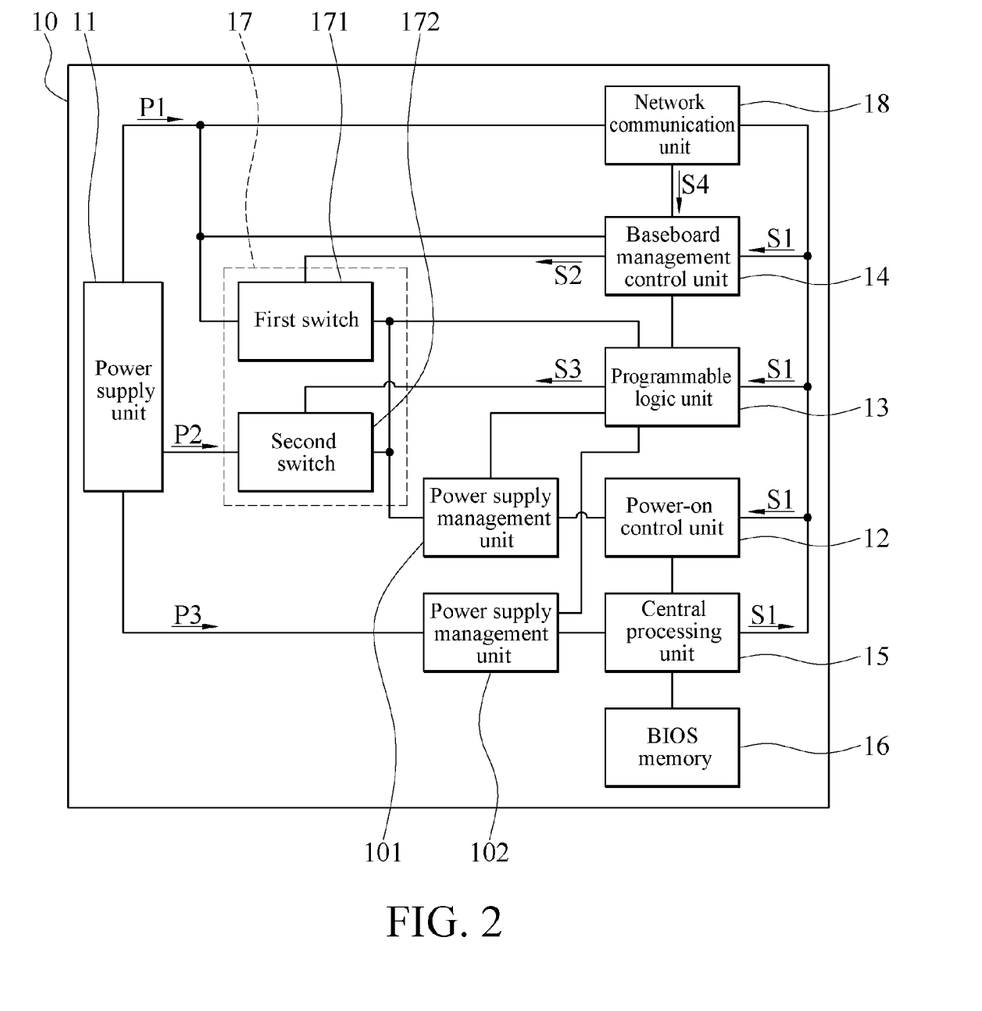
FIG. 2 is a block diagram of a circuit of an embodiment of the server system in FIG. 1.

FIG. 1 is a schematic diagram of an appearance of an embodiment of a server system 10 having a power-saving function according to the present invention. FIG. 2 is a block diagram of a circuit of an embodiment of the server system 10 in FIG. 1. Referring to FIG. 1 and FIG. 2, the server system 10 includes a power supply unit 11, a power-on control unit 12, a baseboard management control unit 14, and a programmable logic unit 13. The power supply unit 11 is coupled to the baseboard management control unit 14. The programmable logic unit 13 is coupled between the baseboard management control unit 14 and the power-on control unit 12. A working mode of the server system 10 includes a soft-off mode (G2/S5 Soft-Off) and a working mode (G0 working) conforming to the ACPI specification, and a power-saving power-off mode. When the server system 10 is in the working mode, the server system 10 may be switched from the working mode to the soft-off mode according to a power-saving power-off signal S1, and then be switched from the soft-off mode to the power-saving power-off mode (that is, a power-saving power-off procedure). When the server system 10 is in the power-saving power-off mode, the server system 10 may be switched from the power-saving power-off mode to the soft-off mode according to a power-on signal S4, and then be switched from the soft-off mode to the working mode.

Figure 3:
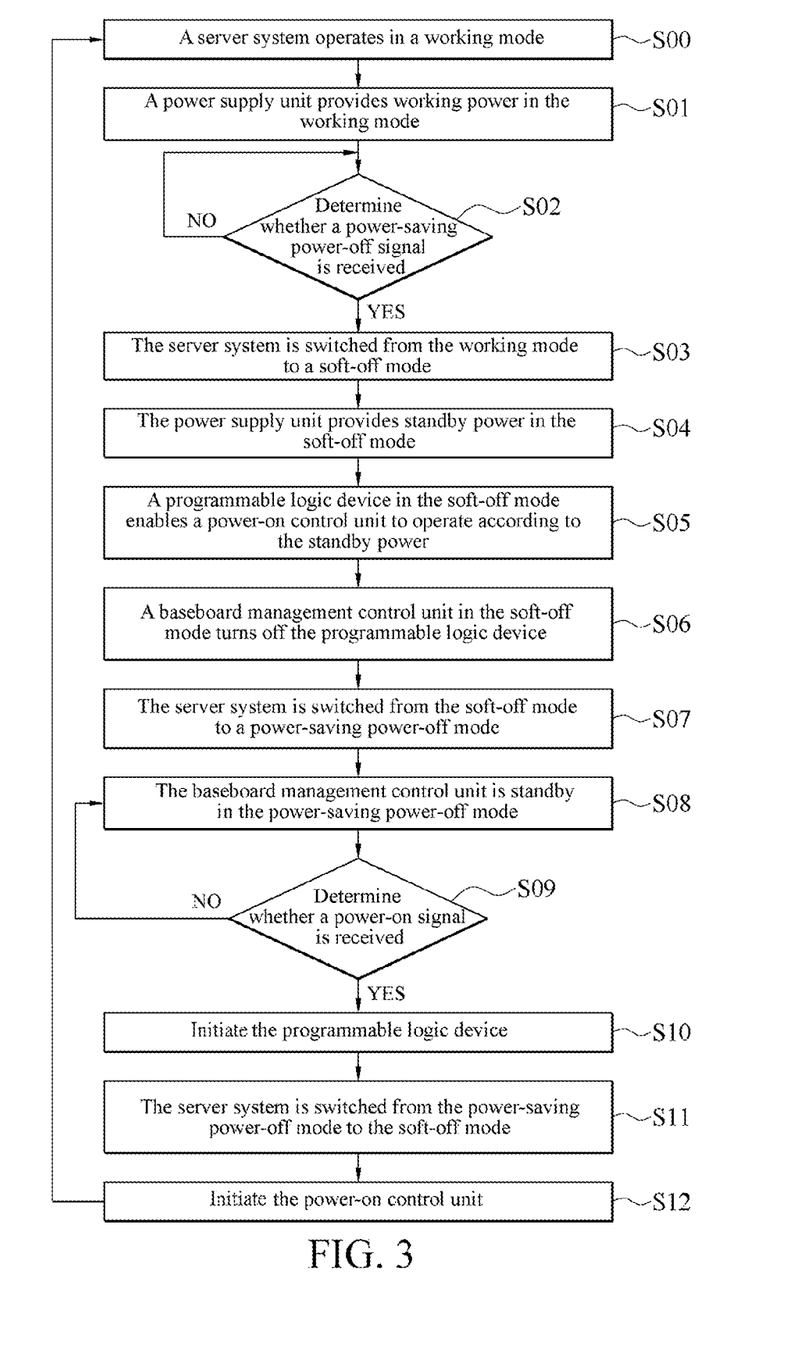
FIG. 3 is a flowchart of an embodiment of a power-saving method of a server system according to the present invention.

In detail, referring to FIG. 2 and FIG. 3, FIG. 3 is a flowchart of an embodiment of a power-saving method of a server system 10 according to the present invention. For example, the server system 10 is first in the working mode (step S00). The power supply unit 11 provides, in the working mode, working power P2 (step S01) for the programmable logic unit 13, the baseboard management control unit 14, and the power-on control unit 12. The baseboard management control unit 14 in the working mode executes a working and monitoring function on the server system 10. The programmable logic unit 13 in the working mode enables the power-on control unit 12 to operate according to the working power P2, and the power-on control unit 12 determines in the working mode whether the power-saving power-off signal S1 is received (step S02). When the power-on control unit 12 receives the power-saving power-off signal S1 (a determining result is YES), the power-on control unit 12 controls the server system 10 to be powered off and switches the server system 10 from the working mode to the soft-off mode (step S03). Then, the power supply unit 11 in the soft-off mode provides standby power P1 for the programmable logic unit 13, the power-on control unit 12, and the baseboard management control unit 14 (step S04). The programmable logic unit 13 operates according to the standby power P1 to enable the power-on control unit 12 to operate according to the standby power P1 (step S05). The baseboard management control unit 14 operates according to the standby power P1, and turns off the programmable logic unit 13 according to the power-saving power-off signal S1 when the programmable logic unit 13 enables the power-on control unit 12 to operate (step S06). After the programmable logic unit 13 is turned off, the power-on control unit 12 is turned off accordingly, because the programmable logic unit 13 does not enable the power-on control unit 12 to operate according to the standby power P1, that is, the power-on control unit 12 is automatically turned off due to a lack of power. Then, after the programmable logic unit 13 and the power-on control unit 12 are turned off, the server system 10 is switched from the soft-off mode to the power-saving power-off mode (step S07), and only the power supply of the baseboard management control unit 14 on a main board of the server system 10 is reserved, so that power consumed by operation of the power-on control unit and the programmable logic unit in the soft-off mode in the prior art is reduced. Compared with the soft-off mode, the server system 10 has a lower power consumption value when operated in the power-saving power-off mode.

In an embodiment, after the server system 10 enters the soft-off mode, the programmable logic unit 13 can control a power supply path between other elements (for example, the CPU 15 shown in FIG. 2) of the server system 10 and the power supply unit 11 to be open, so as to turn off the other elements included in the server system 10. Then, after a preset delay time has elapsed after the server system 10 enters the soft-off mode, the baseboard management control unit 14 starts to turn off the programmable logic unit 13, to ensure that the programmable logic unit 13 turned off the other elements included in the server system 10. That is, the baseboard management control unit 14 starts to turn off the programmable logic unit 13 after the programmable logic unit 13 turns off the other elements included in the server system 10.

In an embodiment, when the server system 10 is in the power-saving power-off mode, the power supply unit 11 provides the standby power P1 for the baseboard management control unit 14, the baseboard management control unit 14 operates to be standby according to the standby power P1 (step S08), and the baseboard management control unit 14 remains until receiving the power-on signal S4, that is, the baseboard management control unit 14 determines whether the power-on signal S4 is received (step S09). When the baseboard management control unit 14 receives the power-on signal S4 (a determining result is "YES"), the baseboard management control unit 14 initiates the programmable logic unit 13 according to the power-on signal S4 (step S10), that is, in the power-saving power-off mode, the baseboard management control unit 14 replaces the programmable logic unit 13 to be responsible for the power supply control of the server system 10. Then, after the baseboard management control unit 14 initiates the programmable logic unit 13, the server system 10 is switched from the power-saving power-off mode to the soft-off mode (step S11). The programmable logic unit 13 in the soft-off mode then enables the power-on control unit 12 to operate according to the standby power P1 to initiate the power-on control unit 12 (step S12). The power-on control unit 12 executes a power-on procedure of the server system 10 after the power-on control unit 12 is initiated, so as to switch the server system 10 from the soft-off mode to the working mode (step S00). After the server system 10 is switched from the soft-off mode to the working mode, the server system 10 may execute various initialization actions, such as executing a power-on process of a unified extensible firmware interface (UEFI).

In an embodiment, the server system 10 further includes a switch circuit 17. The switch circuit 17 is coupled to the power supply unit 11 to receive the working power P2 and the standby power P1 output by the power supply unit 11. Furthermore, the switch circuit 17 is coupled to the programmable logic unit 13 and the baseboard management control unit 14, and the switch circuit 17 is controlled by the programmable logic unit 13 and the baseboard management control unit 14 to output one of the working power P2 and the standby power P1 or not to output the power supply. Furthermore, the switch circuit 17 is coupled between the power supply unit 11 and the power-on control unit 12, and is coupled between the power supply unit 11 and the programmable logic unit 13, so that the power-on control unit 12 and the programmable logic unit 13 can operate according to the working power P2 or the standby power P1 output by the switch circuit 17.

In detail, as shown in FIG. 2, the switch circuit 17 includes a first switch 171 and a second switch 172. The first switch 171 receives the standby power P1 provided by the power supply unit 11, and the second switch 172 receives the working power P2 provided by the power supply unit 11. Control ends of the first switch 171 and the second switch 172 are respectively coupled to the baseboard management control unit 14 and the programmable logic unit 13. The baseboard management control unit 14 can control the first switch 171 to output the standby power P1 or not to output the standby power P1 during operation, and the programmable logic unit 13 can control the second switch 172 to output the working power P2 or not to output the working power P2 during operation. In a power-saving power-off procedure of the server system 10, in step S01, when the server system 10 is in the working mode, the programmable logic unit 13 controls the second switch 172 to output the working power P2 for the power-on control unit 12 to operate. Next, in step S04, when the server system 10 is in the soft-off mode, the programmable logic unit 13 controls the second switch 172 not to output the working power P2, and the baseboard management control unit 14 controls the first switch 171 to output the standby power P1, so that in step S05, the programmable logic unit 13 operates according to the standby power P1 output by the first switch 171, so as to enable the power-on control unit 12 to operate according to the standby power P1 output by the first switch 171. Next, in step S06, the baseboard management control unit 14 then further controls the first switch 171 not to output the standby power P1 to the programmable logic unit 13, and after the foregoing delay time has elapsed after the server system 10 enters the soft-off mode, the baseboard management control unit 14 may control the first switch 171 not to output the standby power P1 to the programmable logic unit 13, so that the programmable logic unit 13 is turned off without receiving the standby power P1, so as to turn off the power-on control unit 12.

In an embodiment, the programmable logic unit 13 may communicate with the baseboard management control unit 14 by using a general-purpose input/output (GPIO) pin. When the server system 10 is switched from the working mode to the soft-off mode, in addition to controlling the second switch 172 not to output the working power P2, the programmable logic unit 13 is further configured to inform that the baseboard management control unit 14 is switched from the working mode to the soft-off mode by pulling up or pulling down the foregoing GPIO pin, so that the baseboard management control unit 14 controls the first switch 171 to output the standby power P1, and then the programmable logic unit 13 in the soft-off mode operates according to the standby power P1 output by the first switch 171.

On the other hand, in the power-on procedure of the server system 10, when the baseboard management control unit 14 receives the power-on signal S4 in the power-saving power-off mode, in step S10, the baseboard management control unit 14 controls the first switch 171 to output the standby power P1, to enable the programmable logic unit 13 to receive the standby power P1 output by the first switch 171 and operate, In step S12, the programmable logic unit 13 enables the power-on control unit 12 to operate according to the standby power P1 output by the first switch 171 so as to execute the power-on procedure, to switch the server system 10 from the soft-off mode to the working mode. The programmable logic unit 13 then controls the second switch 172 to output the working power P2 after the power-on control unit 12 is operated, so that the switch circuit 17 outputs the working power P2 for the power-on control unit 12 to operate in the working mode.

In an embodiment, the foregoing first switch 171 and the second switch 172 may respectively be P-type transistor switches and N-type transistor switches. During operation, the baseboard management control unit 14 may output a low-potential control signal S2 to close the first switch 171 so as to output the standby power P1, or output a high-potential control signal S2 to cut the first switch 171 off so as not to output the standby power P1. During operation, the programmable logic unit 13 may output a high-potential control signal S3 to close the second switch 172 so as to output the working power P2, or to output a low-potential control signal S3 to cut off the second switch 172 so as not to output the working power P2.

In other embodiments, the switch circuit 17 may be implemented by a multiplexer.

In an embodiment, the server system 10 further includes a central processing unit (CPU) 15 coupled to the programmable logic unit 13 and the power supply unit 11. The power supply unit 11 in the working mode further outputs working power P3 for the CPU 15 to operate. The programmable logic unit 13 in the working mode is further configured to enable the CPU 15 to operate according to the working power P3 provided by the power supply unit 11. In an embodiment, a voltage value of the standby power P1 provided by the power supply unit 11 may be 5 V, and voltage values of the working power P2 and P3 may respectively be 5 V and 12 V.

Based on this, the server system 10 further includes a basic input/output system (BIOS) memory 16, coupled to the power-on control unit 12. The BIOS memory 16 stores BIOS code. The BIOS code records a setting, "enabled" or "disabled", of the power-saving power-off mode of the server system 10. When the setting of the power-saving power-off mode is enabled, in the working mode, and a user of the server system 10 operates the server system 10 via a remote device (not shown) or directly operates the server system 10 to control the server system 10 to execute a power-off action, the CPU 15 sends a power-saving power-off signal S1, the baseboard management control unit 14 controls the first switch 171 to output the standby power P1 according to the power-saving power-off signal S1, and the programmable logic unit 13 controls the second switch 172 not to output the working power P2 according to the power-saving power-off signal S1, so that the switch circuit 17 outputs the standby power P1 and the server system 10 is switched from the working mode to the soft-off mode. In the soft-off mode, the baseboard management control unit 14 then controls the first switch 171 not to output the standby power P1 according to the power-saving power-off signal S1 received in the working mode, so that the server system 10 is switched from the soft-off mode to the power-saving power-off mode and the server system 10 operates in the power-saving power-off mode.

On the other hand, when the setting of the power-saving power-off mode is disabled, when the server system 10 operates in the working mode, and a user of the server system 10 controls the server system 10 to execute a power-off action, the CPU 15 sends a soft-off signal instead of a power-saving power-off signal S1. The power-on control unit 12 executes a soft-off procedure according to the soft-off signal, to switch the server system 10 from the working mode to the soft-off mode. After being switched to the soft-off mode, the server system 10 does not be switched to power-saving power-off mode again but operates in the soft-off mode. Based on this, the user of the server system 10 can freely set the power-saving power-off mode to be enabled or disabled, that is, the server system 10 is controlled to execute a power-saving power-off procedure thereof or a soft-off procedure by modifying the BIOS code.

In an embodiment, as shown in FIG. 1 and FIG. 2, the server system 10 further includes a physical power button (power button) 19 and a network communication unit 18 which is coupled to the baseboard management control unit 14 and the power supply unit 11. The network communication unit 18 receives the standby power P1 provided by the power supply unit 11 to operate in the power-saving power-off mode. Based on this, the power-on signal S4 may come from the network communication unit 18 or the physical power button 19 (For example, in FIG. 2, the power on-signal S4 comes from the network communication unit 18). The power-on signal S4 may be generated by the user of the server system 10 by pressing the physical power button 19, or the power-off signal S4 may be sent by the network communication unit 18 in the power-saving power-off mode to the baseboard management control unit 14 by using the foregoing remote device connected to the server system 10, so that the server system 10 executes a power-on procedure, that is, the server system 10 is switched from the power-saving power-off mode to the soft-off mode and then to the working mode.

In an embodiment, the server system 10 further includes two power supply management units 101 and 102. The power supply management unit 101 is coupled between the switch circuit 17 and the power-on control unit 12, and a control end of the power-on control unit 12 is coupled to the programmable logic unit 13. The programmable logic unit 13 can enable or disable the power supply management unit 101 and supply power to the power-on control unit 12 according to the power output by the switch circuit 17 (that is, the working power P2 or the standby power P1), so that the power-on control unit 12 is operated or turned off. The power supply management unit 102 is coupled between the power supply unit 11 and the CPU 15, and a control end of the power supply management unit 102 is coupled to the programmable logic unit 13. The programmable logic unit 13 can enable or disable the power supply management unit 102 and supply power to the CPU 15 according to the working power P3 output by the power supply unit 11, so that the CPU 15 is operated or turned off.

In an embodiment, the programmable logic unit 13 may be a complex programmable logic device (CPLD). The power-on control unit 12 may be a PCH or a south bridge chip. The power supply unit 11 may be a power supply unit (PSU).

In conclusion, according to the embodiments of the server system and the power-saving method thereof of the present invention, the server system can operate in the power-saving power-off mode. In the power-saving power-off mode, the power-on control unit and the programmable logic unit responsible for power supply control are turned off, only the power supply of the baseboard management control unit on a main board of the server system is reserved, and the baseboard management control unit determines, in the power-saving power-off mode, whether the server system needs to be controlled to be powered on. That is, the baseboard management control unit replaces the programmable logic unit to be responsible for power supply control of the server system. In this way, compared with the prior art, power consumed by the standby power-on control unit and programmable logic unit in the soft-off mode of the server system is reduced, and the server system has a low power consumption value, thereby meeting requirements for power saving and energy saving.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A server system, having a soft-off mode and a working mode and a power-saving power-off mode, and comprising:
a power supply unit, configured to provide working power in the working mode and provide standby power in the soft-off mode;
a power-on control unit, configured to:
determine, in the working mode, whether a power-saving power-off signal is received, and when the power-saving power-off signal is received, control the server system to switched from the working mode to the soft-off mode;
a programmable logic unit, coupled to the power supply unit and the power-on control unit, and configured to:
enable, in the working mode, the power-on control unit to operate according to the working power and operate in the soft-off mode according to the standby power to enable the power-on control unit to operate according to the standby power; and
a baseboard management control unit, coupled to the power supply unit and the programmable logic unit, and configured to:
operate in the soft-off mode according to the standby power, and turn off the programmable logic unit according to the power-saving power-off signal when the power-on control unit operates according to the standby power, so as to turn off the power-on control unit and switch the server system from the soft-off mode to the power-saving power-off mode,
wherein power consumption of the server system operating in the power-saving power-off mode is less than that of the server system operating in the soft-off mode, in the power-saving power-off mode, only a power supply of the baseboard management control unit on a main board of the server system is preserved, and the programmable logic unit is a complex programmable logic device (CPLD).

2. The server system according to claim 1, further comprising:
a switch circuit, configured to receive the working power and the standby power from the power supply unit, wherein
in the working mode, the programmable logic unit controls the switch circuit to output the working power for the power-on control unit to operate; when the power-on control unit receives the power-saving power-off signal and controls the server system to be switched from the working mode to the soft-off mode, the baseboard management control unit controls the switch circuit to output, in the soft-off mode, the standby power to the programmable logic unit, and after a delay time has elapsed after the baseboard management control unit controls the switch circuit to output the standby power, the baseboard management control unit controls the switch circuit not to output the standby power to the programmable logic unit so as to turn off the programmable logic unit.

3. The server system according to claim 1, wherein
the server system further comprises a physical power button, and
when the server system is in the power-saving power-off mode, the baseboard management control unit remains in the power-saving power-off mode, until receiving a power-on signal from the physical power button or from a remote device, and initiates the programmable logic unit according to the power-on signal, to switch the server system from the power-saving power-off mode to the soft-off mode.

4. The server system according to claim 3, wherein after the programmable logic unit is initiated according to the power-on signal, the programmable logic unit enables the power-on control unit to operate according to the standby power in the soft-off mode, so that the power-on control unit is initiated to control the server system to be powered on and switched from the soft-off mode to the working mode.

5. The server system according to claim 2, further comprising a physical power button, wherein the baseboard management control unit remains in the power-saving power-off mode, until receiving a power-on signal from the physical power button or from a remote device, to initiate the programmable logic unit according to the power-on signal and switch the server system from the power-saving power-off mode to the soft-off mode, and after the programmable logic unit is initiated, the programmable logic unit enables the power-on control unit to operate according to the standby power in the soft-off mode, so that the power-on control unit is initiated to control the server system to be powered on and switched from the soft-off mode to the working mode; and
when the baseboard management control unit receives the power-on signal, the baseboard management control unit controls the switch circuit to output the standby power for the programmable logic unit to operate in the soft-off mode, to enable the power-on control unit to operate according to the standby power output by the switch circuit, and after the power-on control unit is operated, the programmable logic unit controls the switch circuit to output the working power for the power-on control unit to operate in the working mode.

6. The server system according to claim 1, further comprising:
a switch circuit, configured to receive the working power and the standby power from the power supply unit,
wherein the switch circuit comprises a first switch and a second switch; and the first switch receives, in the soft-off mode, the standby power from the power supply unit, and the second switch receives, in the working mode, the working power from the power supply unit, and
wherein when the server system is in the working mode, the programmable logic unit controls the second switch to output the working power for the power-on control unit to operate; when the power-on control unit receives the power-saving power-off signal and controls the server system to be switched from the working mode to the soft-off mode, the baseboard management control unit controls the first switch to output, in the soft-off mode, the standby power to the programmable logic unit, and after a delay time has elapsed after the baseboard management control unit controls the first switch to output the standby power, the baseboard management control unit controls the first switch not to output the standby power to the programmable logic unit so as to turn off the programmable logic unit, such that server system operates in the power-saving power-off mode.

7. The server system according to claim 6, wherein when the server system operates in the power-saving power-off mode and the baseboard management control unit receives the power-on signal, the baseboard management control unit controls the first switch to output the standby power for the programmable logic unit to operate in the soft-off mode, to enable the power-on control unit to operate according to the standby power output by the first switch, and after the power-on control unit is operated, the programmable logic unit controls the second switch to output the working power for the power-on control unit to operate in the working mode.

8. The server system according to claim 1, wherein after a preset delay time has elapsed after the server system enters the soft-off mode, the baseboard management control unit starts to turn off the programmable logic unit.

9. The server system according to claim 1, further comprising a central processing unit (CPU) coupled to the power-on control unit, and the server system storing a basic input/output system (BIOS) setting that is enabled or disabled corresponding to the power-saving power-off mode, wherein
when the server system is in the working mode and the BIOS setting is enabled, the CPU sends the power-saving power-off signal to the power-on control unit according to the BIOS setting when the server system executes a power-off action, so that the server system is switched from the working mode to the power-saving power-off mode via the soft-off mode and operates in the power-saving power-off mode; and
when the server system is in the working mode and the BIOS setting is disabled, the CPU sends a soft-off signal to the power-on control unit according to the BIOS setting, so that the server system is switched from the working mode to the soft-off mode and operates in the soft-off mode.

10. A power-saving method adapted for a server system, the server system having a power-saving power-off mode and a soft-off mode and a working mode, the power-saving method comprising:
providing, by a power supply unit, working power in the working mode;
enabling, by a programmable logic unit in the working mode, a power-on control unit to operate according to the working power;
determining, by the power-on control unit in the working mode, whether a power-saving power-off signal is received, and when the power-saving power-off signal is received, controlling the server system to switched from the working mode to the soft-off mode;
providing, by the power supply unit, standby power in the soft-off mode after the server system is switched from the working mode to the soft-off mode;
operating, by the programmable logic unit, according to the standby power to enable, in the soft-off mode, the power-on control unit to operate according to the standby power; and
turning off, by a baseboard management control unit, the programmable logic unit according to the power-saving power-off signal when the power-on control unit operates according to the standby power, to turn off the power-on control unit and switch the server system from the soft-off mode to the power-saving power-off mode, wherein power consumption of the server system operating in the power-saving power-off mode is less than that of the server system operating in the soft-off mode, in the power-saving power-off mode, only a power supply of the baseboard management control unit on a main board of the server system is preserved, and the programmable logic unit is a complex programmable logic device (CPLD).

11. The power-saving method according to claim 10, wherein when the server system is in the working mode, in the step of enabling, by a programmable logic unit in the working mode, a power-on control unit, the programmable logic unit controls a switch circuit to output the working power received from the power supply unit for the power-on control unit to operate in the working mode; and after the server system is switched to the soft-off mode, the step of operating, by the programmable logic unit, according to the standby power to enable, in the soft-off mode, the power-on control unit to operate according to the standby power comprises:

controlling, by the baseboard management control unit, the switch circuit to output the standby power received from the power supply unit;

controlling, by the programmable logic unit, the switch circuit not to output the working power; and operating, by the programmable logic unit, according to the standby power output by the switch circuit, wherein in the step of turning off, by a baseboard management control unit in the soft-off mode, the programmable logic unit, after a delay time has elapsed after the baseboard management control unit controls the switch circuit to output the standby power, the baseboard management control unit controls the switch circuit not to output the standby power so as to turn off the programmable logic unit, such that server system operates in the power-saving power-off mode.

12. The power-saving method according to claim 10, further comprising:

when the server system is in the power-saving power-off mode, remaining, by the baseboard management control unit in the power-saving power-off mode, until receiving the power-on signal from a physical power button or from a remote device; and initiating, by the baseboard management control unit in the power-saving power-off mode, the programmable logic unit according to the power-on signal, to switch the server system from the power-saving power-off mode to the soft-off mode.

13. The power-saving method according to claim 12, further comprising: after the programmable logic unit is initiated by the baseboard management control unit, enabling, by the programmable logic unit, the power-on control unit to operate in the soft-off mode according to the standby power to initiate the power-on control unit, so that the power-on control unit controls the server system to be powered on and switched from the soft-off mode to the working mode.

14. The power-saving method according to claim 11, further comprising:

when the server system is in the power-saving power-off mode, remaining, by the baseboard management control unit in the power-saving power-off mode, until receiving the power-on signal from a physical power button or from a remote device;

when the baseboard management control unit receives the power-on signal in the power-saving power-off mode, controlling, by the baseboard management control unit, the switch circuit to output the standby power for the programmable logic unit to operate, so that the server system operates in the soft-off mode;

after the programmable logic unit is operated, enabling, by the programmable logic unit, the power-on control unit to operate according to the standby power output by the switch circuit, so that the power-on control unit controls the server system to be powered on and switched from the soft-off mode to the working mode; and controlling, by the programmable logic unit in the working mode, the switch circuit to output the working power for the power-on control unit to operate in the working mode.

15. The power-saving method according to claim 10, wherein when the server system is in the working mode, in the step of enabling, by the programmable logic unit in the working mode, the power-on control unit, the programmable logic unit controls a second switch of a switch circuit to output the working power received from the power supply unit for the power-on control unit to operate in the working mode; and after the server system is switched to the soft-off mode, the step of operating, by the programmable logic unit in the soft-off mode according to the standby power comprises:

controlling, by the baseboard management control unit, a first switch of the switch circuit to output the standby power received from the power supply unit;

controlling, by the programmable logic unit, the second switch not to output the working power; and operating, by the programmable logic unit, according to the standby power output by the first switch, wherein in the step of turning off, by the baseboard management control unit in the soft-off mode, the programmable logic unit, after a delay time has elapsed after the baseboard management control unit controls the first switch to output the standby power, the baseboard management control unit controls the first switch not to output the standby power, so as to turn off the programmable logic unit.

16. The power-saving method according to claim 15, further comprising:

when the server system is in the power-saving power-off mode, remaining, by the baseboard management control unit in the power-saving power-off mode, until receiving the power-on signal from a physical power button or from a remote device;

when the baseboard management control unit receives the power-on signal in the power-saving power-off mode, controlling, by the baseboard management control unit, the first switch to output the standby power for the programmable logic unit to operate, so that the server system operates in the soft-off mode;

after the programmable logic unit is operated, enabling, by the programmable logic unit, the power-on control unit to operate according to the standby power output by the first switch, so that the power-on control unit controls the server system to be powered on and switched from the soft-off mode to the working mode; and controlling, by the programmable logic unit in the working mode, the second switch to output the working power for the power-on control unit to operate in the working mode.

17. The power-saving method according to claim 10, wherein in the step of turning off, by a baseboard management control unit, the programmable logic unit according to the power-saving power-off signal, after a preset delay time has elapsed after the server system enters the soft-off mode, the baseboard management control unit initiates to turn off the programmable logic unit.

18. The power-saving method according to claim 11, further comprising:

- when the server system executes a power-off action, determining, by a central processing unit (CPU) in the working mode, whether a basic input/output system (BIOS) setting corresponding to the power-saving power-off mode is enabled or disabled;
- when the CPU determines that the BIOS setting is enabled, sending, by the CPU, the power-saving power-off signal to the power-on control unit, to switch the server system from the working mode to the power-saving power-off mode via the soft-off mode; and
- when the CPU determining that the BIOS setting is disabled, sending, by the CPU a soft-off signal to the power-on control unit, to switch the server system from the working mode to the soft-off mode, so that the server system stays in the soft-off mode.

* * * * *